US005467812A

United States Patent [19]
Dean et al.

[11] Patent Number: 5,467,812
[45] Date of Patent: Nov. 21, 1995

[54] AIR CONDITIONING SYSTEM WITH THERMAL ENERGY STORAGE AND LOAD LEVELING CAPACITY

[75] Inventors: William J. Dean, Grapevine; Theodore C. Gilles, Dallas, both of Tex.

[73] Assignee: Lennox Industries Inc., Dallas, Tex.

[21] Appl. No.: 293,875

[22] Filed: Aug. 19, 1994

[51] Int. Cl.⁶ ........................... F25B 25/00
[52] U.S. Cl. ............... 165/2; 62/59; 62/332; 62/DIG. 2; 165/62
[58] Field of Search .................. 62/160, 324.6, 62/430, DIG. 2, 59, 332.1; 165/18, 62

[56] References Cited

U.S. PATENT DOCUMENTS

| | | | |
|---|---|---|---|
| 4,044,568 | 8/1977 | Hagen | 62/73 |
| 4,135,571 | 1/1979 | Tamblyn et al. | 165/18 |
| 4,192,146 | 3/1980 | Crede | 62/59 X |
| 4,253,309 | 3/1981 | Abrahamsson et al. | 62/98.1 |
| 4,256,475 | 3/1981 | Schafer | 165/2 X |
| 4,375,831 | 3/1983 | Downing, Jr. | 62/238.7 X |
| 4,380,156 | 4/1983 | Ecker | 62/235.1 |
| 4,527,618 | 7/1985 | Fyfe et al. | 165/18 |
| 4,645,908 | 2/1987 | Jones | 62/160 X |
| 4,671,077 | 6/1987 | Faradis | 62/324.1 |
| 4,718,248 | 1/1988 | Fisher | 62/238.7 |
| 4,735,064 | 4/1988 | Fischer | 62/59 |
| 4,753,080 | 6/1988 | Jones et al. | 62/59 |
| 4,809,516 | 3/1989 | Jones | 62/160 |
| 4,909,041 | 3/1990 | Jones | 62/99 |
| 4,916,916 | 4/1990 | Fischer | 62/199 |
| 4,940,079 | 7/1990 | Best et al. | 165/18 X |
| 5,165,250 | 11/1991 | Nagatomo et al. | 165/18 X |
| 5,211,029 | 5/1993 | Uselton, et al. | 62/324.5 |
| 5,255,526 | 10/1993 | Fischer | 62/118 X |
| 5,307,642 | 5/1994 | Dean | 62/59 |
| 5,355,688 | 10/1994 | Rafalovich et al. | 62/160 |

*Primary Examiner*—William E. Wayner
*Attorney, Agent, or Firm*—W. Kirk McCord

[57] ABSTRACT

A vapor compression air conditioning (cooling and heating) system adapted for operation to reduce the consumption of electric power during peak periods of demand for power is characterized by three refrigerant circuits. A refrigerant circuit includes a compressor, outdoor heat exchanger and first indoor heat exchanger for selectively cooling or heating an indoor air space and a second refrigerant circuit comprises the compressor, outdoor heat exchanger and a thermal energy storage unit characterized by a tank having a thermal energy storage medium disposed therein and a heat exchanger coil in communication with the compressor and outdoor heat exchanger for cooling the thermal energy storage medium. A third refrigerant circuit includes the thermal energy storage heat exchanger coil, a refrigerant pump and another indoor heat exchanger in communication with the fluid (e.g., indoor air) to be cooled or heated. Plural isolation valves in the first and second refrigerant circuits, reversing valves in communication with the compressor and pump and a heater in the storage tank provide for operating the system in plural cooling and heating modes to provide cooling and heating with reduced power consumption during peak electrical power demand periods.

20 Claims, 1 Drawing Sheet

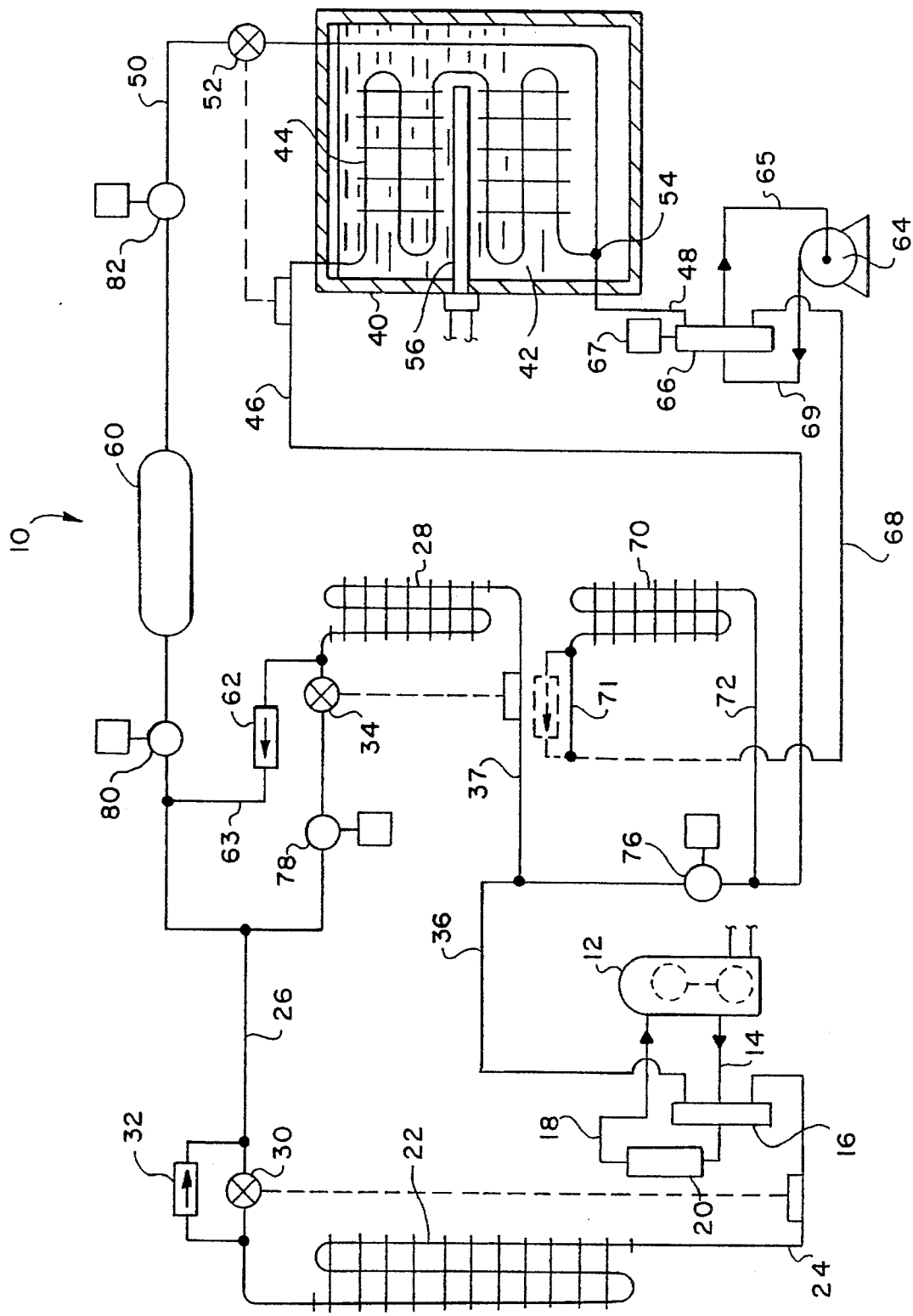

AIR CONDITIONING SYSTEM WITH THERMAL ENERGY STORAGE AND LOAD LEVELING CAPACITY

TECHNICAL FIELD

The present invention pertains to air conditioning systems with thermal energy storage and in particular to an improved air conditioning system with thermal energy storage and load leveling capacity.

BACKGROUND ART

Electric power suppliers or so-called electric utilities charge higher rates for both summer and winter peak cooling and heating conditions. For example, in warm weather conditions, peak electricity usage is usually in the afternoon hours and in the heating seasons peak electricity usage may be in the early morning hours when heating systems return to normal daytime temperature settings and electric water heaters, for example, are subject to above-normal usage. So-called thermal energy storage systems have been developed for minimizing the use of electrical energy during peak periods. U.S. Pat. Nos. 5,211,029 (to Uselton, et al), issued May 18, 1993 and 5,307,642 (to Dean), issued May 3, 1994, assigned to the assignee of the present invention, and U.S. Pat. No. 5,255,526 (to Fischer) issued Oct. 26, 1993 describe air conditioning systems which utilize a thermal energy storage tank having a phase change material, such as water, disposed therein. During off-peak electricity usage periods, refrigerant is circulated through a heat exchanger in the storage tank to produce ice, and during peak electricity usage periods, refrigerant is circulated between the storage tank and an indoor heat exchanger coil or evaporator by a low-power consuming pump to provide the requisite cooling effect. Thermal energy storage systems may also be used for heating, as shown in U.S. Pat. No. 4,645,908 (to Jones). So-called load leveling systems provide for simultaneous operation of a thermal energy storage unit and a vapor compression refrigerant circuit, as shown in U.S. Pat. No. 4,916,916 (to Fischer).

However, known types of load leveling systems do not provide for two independent indoor heat exchangers which provide cooling simultaneously from both a thermal energy storage unit and from a vapor compression refrigerant circuit. Still further, known types of load leveling systems do not provide for both heating and cooling by simultaneously operating a thermal energy storage unit and a vapor compression refrigerant circuit with respective separate indoor heat exchangers. It is to these ends that the present invention has been developed.

DISCLOSURE OF INVENTION

The present invention provides a unique load-leveling-type air conditioning system. The system includes a compressor, a first heat exchanger, a second heat exchanger, a temporary refrigerant storage vessel and a thermal energy storage unit. The thermal energy unit includes a storage tank with a third heat exchanger and a phase change material, such as water, disposed in the tank and a refrigerant circulating pump for circulating refrigerant between the thermal energy storage unit and either the second heat exchanger or a fourth heat exchanger.

The thermal energy storage unit may be provided with a heating element to heat the phase change material in the tank and may be operated to act as both a heat source and a heat sink. The arrangement of the components of the system is such that the system may be operated to provide both heating and cooling of indoor air, for example, at predetermined "load" conditions while requiring approximately only one-half of the power required by conventional heating and cooling systems for meeting the same thermal load requirements.

The system is capable of being operated in at least eight different modes (four cooling modes and four heating modes), not including two transitory modes for moving the refrigerant charge to and from the thermal energy storage unit. During so-called off-peak electricity usage periods, the system is operable in a first cooling mode to circulate refrigerant through the thermal energy storage tank to cool the phase change material which, if such comprises water, is cooled sufficiently to manufacture a substantial amount of ice in the storage tank. The refrigerant liquid storage vessel is interposed in a refrigerant circuit between the first heat exchanger operating as a condenser and the third heat exchanger in the storage tank operating as an evaporator to store excess refrigerant during the first cooling mode.

A second cooling mode of operation of the system is characterized by circulating refrigerant from the compressor to the first heat exchanger operating as a condenser and then to one of the second and fourth heat exchangers operating as an evaporator to provide direct indoor air cooling in a conventional manner.

A third cooling mode of operation of the system provides for circulation of refrigerant between the third heat exchanger in the storage tank operating as a condenser and one of the second and fourth heat exchangers operating as an evaporator by a liquid pump having substantially reduced power requirements while providing approximately half of the total cooling capacity of the system.

In accordance with yet a further aspect of the invention, the system may be operated in a fourth cooling mode wherein full capacity cooling is provided by circulating refrigerant from the compressor through the first heat exchanger operating as a condenser and one of the second and fourth heat exchangers operating as an evaporator while, simultaneously, refrigerant is circulated through a circuit which includes the third heat exchanger operating as a condenser and the other one of the second and fourth heat exchangers operating as an evaporator by way of the refrigerant circulating pump. In this mode of operation, full cooling capacity of the system is provided at approximately one-half of the electrical power which would be required of a conventional vapor compression refrigeration or air conditioning system.

Still further, the invention provides for four heating modes of operation, including a first heating mode wherein an electrical resistance heating element, for example, disposed in the thermal energy storage tank, is operated during off-peak electrical usage periods to heat the phase change material in the storage tank. In a second heating mode of operation, direct heat generation is provided by the compressor, the condenser and one of the second and fourth heat exchangers operating in a reverse or so-called heat pump mode wherein one of the second and fourth heat exchangers is used as a condenser and the first heat exchanger functions as an evaporator.

The invention provides a third heating mode wherein refrigerant fluid is heated to evaporation by the phase change material in the thermal energy storage tank and the refrigerant fluid is circulated by the pump to one of the second and fourth heat exchangers and condensed to provide heating of the indoor air. Still further, the invention provides a fourth heating mode in which the system is capable of full capacity heating wherein refrigerant is circulated between the compressor and one of the second and fourth heat exchangers in the heat pump mode while simultaneously refrigerant is circulated between the thermal energy storage tank and the other one of the second and fourth heat exchangers to provide full capacity heating.

The system provides several advantages which will be recognized by those of skill in the art. In particular, a system is provided wherein both cooling and heating requirements are met with approximately one-half of the electrical power requirements of conventional vapor compression air conditioning systems or heat pumps. The system provides load-leveling in both cooling and heating operations to take advantage of off-peak electrical power pricing. Peak cooling and heating loads can be easily met with the system of the invention while requiring substantially reduced electrical power demand. The system may be used in place of conventional commercial and residential heat pumps which use electrical resistance-type heating elements, for example, to meet peak heat load requirements. Those skilled in the art will further appreciate the above-mentioned features and advantages of the invention together with other superior aspects thereof upon reading the detailed description which follows in conjunction with the drawing.

BRIEF DESCRIPTION OF THE DRAWING

The drawing FIGURE is a schematic diagram of the system of the present invention.

BEST MODE FOR CARRYING OUT THE INVENTION

In the description which follows, like elements are marked throughout the specification and drawing with the same reference numerals, respectively. The drawing FIGURE is not to scale and most of the elements are shown in schematic form in the interest of clarity and conciseness.

Referring to the drawing, there is illustrated in schematic form an improved air conditioning (cooling and heating) system in accordance with the invention and generally designated by the numeral 10. The system 10 is adapted to operate with conventional refrigerant fluids used for commercial and residential cooling systems. The system 10 includes a motor driven compressor 12, connected to a compressed gas discharge line 14, which is connected to a conventional four-way reversing valve 16. The compressor 12 also has a low-pressure vapor or gaseous refrigerant fluid suction or inlet line 18 which is connected to the reversing valve 16 by way of a conventional suction line accumulator 20. A first refrigerant-to-air heat exchanger 22 is suitably connected to the reversing valve 16 by a conduit 24 and by way of a conduit 26 to a second refrigerant-to-air heat exchanger 28. A conventional superheat controlled or thermostatic-type thermal expansion device 30 and a check valve 32 are operably interposed in the conduit 26 to allow the heat exchanger 22 to operate as an evaporator in a heat pump operating mode. A second thermostatic-type thermal expansion device 34 is interposed in the conduit 26 upstream of the heat exchanger 28, which operates as an evaporator when the system is operating to provide cooling to indoor air, for example, flowing over the heat exchanger 28. Refrigerant fluid is returned to the compressor from the heat exchanger 28 by way of conduits 36, 37 and the reversing valve 16. The aforementioned portion of the system 10 forms a first refrigerant circuit.

The system 10 also includes a thermal energy storage unit comprising an insulated tank 40, which is operable to contain a quantity of suitable phase change material such as water 42. The thermal energy storage unit may be adapted for refrigeration applications. For example, glycol or salt may be added to water 42 to lower the freezing temperature substantially below 32° F., for example, to approximately 20° F. When operated with a standard refrigeration system (not shown) instead of an air conditioning system, evaporating temperatures on the order of 33° F. (instead of 45° F. for an air conditioning system) may be achieved, which is suitable for refrigeration applications. A third heat exchanger 44 is immersed in the water 42 within the tank 40 and is connected to a refrigerant fluid transfer conduit 46, a second refrigerant fluid transfer conduit 48 and a third conduit 50 having a conventional thermal expansion device 52 interposed therein. The conduit 50, heat exchanger 44 and conduit 48 are interconnected at a suitable junction 54 within the tank 40. The above-described thermal energy storage unit also includes a heating element 56 suitably disposed within the tank 40. The heating element 56 may be a conventional electrical resistance heater operably connected to a source of electrical power (not shown). The conduit 50 is connected to the conduit 26 and has interposed therein a refrigerant liquid storage vessel 60 for storing excess refrigerant during certain operating modes of the system 10. A suitable by-pass-type check valve 62 is interposed in a conduit 63 interconnecting the conduit 26 and the conduit 50 as illustrated. The compressor 12, heat exchanger 22, conduits 26 and 50, heat exchanger 44 and conduits 46 and 36 form a second refrigerant circuit of the system 10.

The system 10 still further includes a liquid circulation pump 64 operably connected to the conduit 48 by a four-way reversing valve 66, which may be similar in some respects to the reversing valve 16 but is preferably provided with a solenoid operator 67 for shifting the valve to provide fluid flow in the directions to be described herein. The four-way valve 66 is also connected to a conduit 68, which is in communication with a fourth heat exchanger (also a refrigerant-to-air heat exchanger) 70 similar to the heat exchanger 28 and operable to provide cooling or heating of air passing thereover, in a conventional manner. The pump 64 has an inlet or suction conduit 65 and discharge conduit 69 suitably connected to the valve 66. The heat exchanger 70 is in communication with the conduits 36, 46, by way of a suitable connecting conduit 72. As previously described, the conduit 36 is also in communication with the heat exchanger 28 by connecting conduit 37 and with the heat exchanger 44 in the tank 40 by way of the conduit 46, as illustrated. A short portion 71 of conduit 68 may comprise a capillary tube expansion device or a conventional thermostatic expansion device and bypass valve may be interposed in conduit 71.

The system 10 is also provided with four on-off-type solenoid operated valves 76, 78, 80 and 82. The valves 80 and 82 are interposed in the conduit 50 on opposite sides of the liquid refrigerant storage vessel 60 while the valve 76 is interposed in the conduit 46 between the conduit 72 and the conduits 36, 37. The solenoid valve 78 is interposed in the conduit 26 between the expansion device 30 and the expansion device 34. The heat exchanger 44, pump 64, valve 66, heat exchanger 70 and connecting conduits 48, 65, 68, 69, 72 and 46 form a third refrigerant circuit.

The system 10 may utilize several conventional elements which have been previously described in somewhat general terms. The compressor 12 may be a conventional motor driven compressor of a type well known for use in vapor compression refrigeration or air conditioning systems. In like manner, the reversing valve 16 may be conventional and the expansion devices 30, 34 and 52 may be conventional superheat controlled expansion devices, as illustrated. Heat exchanger 22 may be an outdoor refrigerant-to-air heat exchanger, such as a serpentine coil having suitable finned heat exchange surfaces and operable to have air circulated thereover by a suitable motor-driven fan (not shown). Heat exchanger 22 may also be of a type which is in communication with another heat source or heat sink (not shown). The heat exchangers 28 and 70 may be conventional indoor air evaporator coil-type heat exchangers, wherein air is circulated thereover by suitable fans (also not shown). The insulated tank 40 may be of generally conventional construction for pressure vessels and the serpentine coil-type heat exchanger 44 disposed therein may also be of generally conventional construction. The pump 64 should be of a type which is adapted to pump a mixed phased fluid, gas and liquid, without potential for damage to the pump. Certain types of rotary vane or helical screw-type pumps may be utilized for the pump 64.

The modes of operation of the system 10 will now be described in conjunction with Table I, which indicates the operating condition of certain elements of the system including the compressor 12, the heating element 56, the pump 64, and the solenoid valves 76, 78, 80 and 82.

TABLE I

| Mode | 12 | 56 | 64 | 76 | 78 | 80 | 82 |
|---|---|---|---|---|---|---|---|
| 1 | 1 | 0 | 0 | 1 | 0 | 1 | 1 |
| 2 | 1 | 0 | 0 | 0 | 1 | 0 | 0 |
| 3 | 0 | 0 | 1 | 0 | 0 | 0 | 1 |
| 4 | 1 | 0 | 1 | 0 | 1 | 0 | 1 |
| 5 | 0 | 1 | 0 | 0 | 0 | 0 | 0 |
| 6 | 1 | 0/1 | 0 | 0 | 0 | 0 | 0 |
| 7 | 0 | 0 | 1 | 0 | 0 | 0 | 0 |
| 8 | 1 | 0 | 1 | 0 | 0 | 0 | 0 |
| HM | 0 | 0 | 0 | 1 | 1 | 0 | 1 |
| PO | 1 | 0 | 0 | 1 | 0 | 1 | 0 |

The operating modes are indicated as nos. 1 through 8, and two temporary modes are indicated and designated hypermigration (HM) and pumpout (PO). A "0" in regard to an operating mode of a particular element indicates that the element is in a closed, off or deenergized condition and a "1" in regard to a particular operating mode indicates that the element is in an open, on or energized condition, respectively.

Operating mode 1 is typically a summertime or hot weather mode of operation during off-peak electrical demand periods wherein so-called ice-making is provided for the phase change material 42 which is converted from a liquid to a solid, for example. In operating mode 1, the compressor 12 is operating, the heating element 56 is not operating, the pump 64 is not operating, the solenoid valve 78 is closed and solenoid valves 76, 80 and 82 are open. Compressed gas refrigerant leaves the compressor 12 and flows through the reversing valve 16 and conduit 24 to heat exchanger 22, which operates as a condenser. The condensed refrigerant flows through the bypass valve 32, conduits 26 and 50, the expansion device 52 and into the heat exchanger coil 44, which operates as an evaporator. Refrigerant, of course, leaves the expansion device 52 at a reduced pressure and cools the phase change material, such as water, 42 in the tank 40. Evaporated refrigerant is pulled back through conduit 46, valve 76 and conduit 36 to the compressor 12 by way of the reversing valve 16. During this operating mode, some excess liquid refrigerant is stored in storage vessel 60.

Operating mode 2 is sometimes known as first-stage direct cooling and is characterized by operation of the compressor 12 to deliver high pressure gaseous refrigerant by way of the reversing valve 16 and the conduit 24 to the heat exchanger 22, which operates as a condenser. Condensed refrigerant flows through the by-pass valve 32 to the heat exchanger 28, which is now operating as an evaporator coil. Accordingly, valve 78 is open and the thermal expansion device 34 is operable to reduce the pressure of the liquid refrigerant as it enters the heat exchanger 28. Evaporated refrigerant returns to the compressor via conduits 37, 36 and valve 16. In the direct cooling operating mode 2, valves 76, 80 and 82 are closed and neither the pump 64 nor the heating element 56 are in operation during the steady state portion of the direct cooling operating mode. In the direct cooling mode 2, the system 10 is operating at approximately one-half of its total cooling capacity.

A third operating mode, designated as mode 3, and also known as first-stage shift cooling is carried out by shutting down the compressor 12 and starting the pump 64 while closing valves 76, 78 and 80 and opening valve 82. The four-way valve 66 is positioned such that liquid refrigerant will move from pump 64 through conduit 68, the heat exchanger 70, the conduit 72, the conduit 46 and the heat exchanger 44 back to the pump. Refrigerant is drawn out of the heat exchanger 44 by way of the conduit 48 and the four-way valve 66 to the pump inlet by way of conduit 65. Solenoid valve 82 is left open only long enough to draw sufficient refrigerant into the heat exchanger 44 to provide a full charge of refrigerant to circulate in the manner just described. As refrigerant passes through the heat exchanger 70, it evaporates and returns to the heat exchanger 44 where the low temperature of the medium 42 will cause the refrigerant to again condense into liquid form for circulation by the pump 64. The capacity of the system 10, in the operating mode 3, usually may be the same as in operating mode 2. However, an important advantage of operating mode 3 is that the power required for operating the pump 64 is on the order of 10–20% of the power required to operate the compressor 12. Heat exchanger 70 operates as an evaporator and heat exchanger 44 operates as a condenser in operating mode 3. Storage vessel 60 has sufficient storage capacity to store the amount of refrigerant required to support mode 3 operation.

In order to pass from operating mode 2 to operating mode 3, also known as the shift cooling mode, the system 10 operates in a transition mode known as hypermigration (HM). The hypermigration cycle usually takes a relatively short time, about three to five minutes, in a system having about 10 tons cooling capacity. In the hypermigration mode, the heat exchanger 44 is utilized as a heat sink at about 32° F., or at the freezing point of the phase change medium 42 if it is other than fresh water. Refrigerant fluid in the heat exchanger 44 condenses and the pressure within the system 10 decreases. Since refrigerant fluid throughout the rest of the system 10 is at a much higher pressure and temperature, a refrigerant fluid charge is drawn into the heat exchanger 44 during the hypermigration mode. Table I shows the operating condition of the items listed during hypermigration.

The system 10 is advantageously operable to accept a cooling load that requires the compressor 12, heat exchanger 22 operating as a condenser and heat exchanger 28 operating as an evaporator in the same manner as in mode 2, while simultaneously operating the thermal energy storage tank 40 in conjunction with heat exchanger 70 operating as an evaporator and heat exchanger 44 operating as a condenser in the same manner as in mode 3. Accordingly, a full load capacity mode 4 operating condition may be sustained by the system 10. When transitioning from the so-called shift cooling mode 3 to the full load capacity mode 4 or when starting full load capacity mode 4 with a sufficient charge of ice or solid phase condition of the medium 42, mode PO is carried out wherein valves 78 and 82 are closed, valves 76 and 80 are open and compressor 12 is operated to pull liquid refrigerant into receiver vessel 60 and heat exchanger 22. Compressor 12 is operated until the compressor suction pressure reaches a predetermined valve (e.g., 20 psig). At this time, mode PO is concluded and the system is operable in mode 4.

In mode 4, valve 80 is closed while valves 78 and 82 are opened and valve 76 is closed. The pump 64 is started to circulate refrigerant through the heat exchanger 70 and the heat exchanger 44 to provide cooling effect to air passing over the heat exchanger 70. The compressor 12 is operated in a conventional manner to pump refrigerant through the reversing valve 16, conduit 24, heat exchanger 22 and through the heat exchanger 28 to cool air passing over heat exchanger 28. Table I also shows the operating condition of the various elements in the full load capacity mode 4. The system 10 may, of course, be operated in the full load capacity mode 4 until all of the ice in the tank 40 is melted or the medium 42, if other than fresh water, has changed its phase from solid to liquid and the temperature of the liquid has begun to rise sufficiently that heat exchanger 70 is no longer effecting sufficient cooling to meet the load requirements. In mode 4, heat exchangers 28, 70 provide a dual evaporator capability for simultaneous operation of compressor 12 and pump 64, whereby direct cooling and shift cooling are operated in parallel.

The system 10 is also advantageously operable to provide for heating indoor air or the load associated with the heat exchangers 28 and 70. The various operating conditions or modes in which the system 10 may be operated to provide heat at the heat exchangers 28 and 70 will now be described. The first heating mode is designated as mode 5 and is that in which, during off-peak electricity demand periods, the heating element 56 is used to heat the phase change material or medium 42 to a suitable temperature. For example, if the material 42 is fresh water, the heating element 56 may be operated to heat the water to a temperature in the range of 180° F. to 190° F. In this operating condition, any refrigerant in the heat exchanger 44 and the conduits connected thereto will tend to migrate to the heat exchanger 70. Typically, in operating mode 5, the valves 76, 78, 80 and 82 are closed, the compressor 12 is in an off condition and the pump 64 is in an off condition.

The system 10 may be operated in mode 6, also known as the direct heating mode, while operating in mode 5 or not operating in mode 5, as the choice may be. In the direct heating mode 6, the compressor 12, reversing valve 16, heat exchanger 22 and heat exchanger 28 are operated in the manner of a conventional heat pump. In other words, the reversing valve 16 is positioned such that high pressure refrigerant gas discharged from the compressor 12 passes through conduit 36, conduit 37 and gives up heat to the medium passing over the heat exchanger 28, which now operates as a condenser, to condense the refrigerant, which then flows as a liquid through check valve 62 and conduit 26. The thermostatic expansion device 30 reduces the pressure of the refrigerant as it passes through heat exchanger 22, now operating as an evaporator. Gaseous refrigerant leaving the heat exchanger 22 passes through the reversing valve 16 and into the compressor 12 inlet by way of conduit 18.

An alternative heating mode 7 may be carried out in place of mode 6, referring to Table I, wherein the compressor 12 is in an off condition and the heating element 56 is deenergized while the pump 64 is energized to circulate refrigerant fluid between the heat exchanger 70 and the heat exchanger 44. In operating mode 7, which may also be designated as first stage shift heating, the electrical power requirement of system 10 is only that which is required to circulate the refrigerant fluid with the pump 64, that is on the order of 10% to 20% of the power requirements of the compressor 12. In heating mode 7, refrigerant fluid is drawn from the heat exchanger 70, through the conduit 68 to the valve 66 which has been positioned to provide for the conduit 68 to be in communication with the inlet of pump 64. This position of valve 66 places the conduit 48 in communication with the heat exchanger 44 so that liquid refrigerant enters the heat exchanger 44 and is evaporated by the heated material 42. Hot gaseous refrigerant leaves the heat exchanger 44 and flows through conduit 46 and through the heat exchanger 70, which now operates as a condenser, by way of conduit 72, whereupon the fluid condenses back to liquid form and is again circulated by the pump 64. Assuming 90° F. of usable heat storage in the tank 40, the cool storage to heat storage ratio of the thermal energy storage unit is about 1.33.

A final operating mode of the system 10 is that wherein, essentially, modes 6 and 7 are carried out simultaneously as mode 8. That is, the compressor 12 is operated in the heat pump mode to supply hot gaseous refrigerant fluid to the heat exchanger 28 and the pump 64 is operating to circulate refrigerant fluid through the tank 40 and to the heat exchanger 70 in a hot gaseous form. Placing the system 10 in condition to operate in modes 6, 7 or 8 may require brief operation in the hypermigration or pump-out mode to place a sufficient charge of refrigerant in the respective circuits which are operable in modes 6, 7 and 8. In mode 8, heat exchangers 28, 70 provide a dual condenser capability for simultaneous operation of compressor 12 and pump 64, whereby direct heating and shift heating are operated in parallel.

Those skilled in the art will recognize that the system 10 may be provided with suitable controls for sensing the load requirements of the system in both the cooling and heating modes and for operating the system to take advantage of off-peak electricity pricing, whereupon the system is operated in a selected mode which is appropriate for the peak or off-peak energy pricing period as well as for the heating or cooling load time periods, respectively.

Although a preferred embodiment of the system 10 has been described in detail herein, together with the unique methods of operation of the system 10, those skilled in the art will also recognize that various substitutions and modifications may be made to the system 10 as well as the unique operating methods without departing from the scope and spirit of the invention, as recited in the appended claims.

We claim:

1. An air conditioning system comprising:

a compressor for compressing a refrigerant;

a first heat exchanger operably connected to said compressor;

a second heat exchanger operably connected to said first heat exchanger and said compressor, said compressor being operable to circulate refrigerant between said first heat exchanger and said second heat exchanger, whereby fluid in heat exchange relationship with said second heat exchanger is cooled;

a thermal energy storage unit comprising a tank having a thermal energy storage medium disposed therein and a third heat exchanger disposed in said medium, said third heat exchanger being operably connected to said compressor and said first heat exchanger, said compressor being operable to circulate refrigerant between said third heat exchanger and said first heat exchanger to cool said medium;

a fourth heat exchanger operably connected to said third heat exchanger;

refrigerant circulation means for circulating refrigerant between said third heat exchanger and said fourth heat exchanger, whereby fluid in heat exchange relationship with said fourth heat exchanger is cooled; and flow control means interposed in said system for selective operation to effect refrigerant flow through a first circuit comprising said compressor, said first heat exchanger and said second heat exchanger, a second circuit comprising said compressor, said first heat exchanger and said third heat exchanger and a third circuit comprising said third heat exchanger, said refrigerant circulation means and said fourth heat exchanger, whereby said system is selectively operable in a first operating mode wherein refrigerant flows through said first circuit to cool fluid in heat exchange relationship with said second heat exchanger, in a second operating mode wherein refrigerant flows through said second circuit to cool said thermal energy storage medium, in a third operating mode wherein refrigerant flows through said third circuit to cool fluid in heat exchange relationship with said fourth heat exchanger, and in a fourth operating mode wherein refrigerant flows simultaneously through said first and third circuits to cool fluid in heat exchange relationship with said second heat exchanger and fluid in heat exchange relationship with said fourth heat exchanger.

2. The system set forth in claim 1 including a refrigerant storage vessel interposed in said second circuit between said first heat exchanger and said third heat exchanger for temporary storage of an excess quantity of refrigerant.

3. The system set forth in claim 2 including a first isolation valve interposed in a conduit between said storage vessel and said first heat exchanger for isolating said storage vessel from said first heat exchanger and a second isolation valve interposed in said second circuit between said storage vessel and said third heat exchanger for isolating said storage vessel from said third heat exchanger.

4. The system set forth in claim 1 including an isolation valve interposed in said system for isolating said first refrigerant circuit from said third refrigerant circuit.

5. The system set forth in claim 1 including flow reversing means operably connected to said compressor for reversing the flow of refrigerant in said first circuit to provide heated refrigerant to said second heat exchanger for heating fluid in heat exchange relationship with said second heat exchanger when refrigerant flows through said first circuit in one direction and to provide cooled refrigerant to said second heat exchanger for cooling fluid in heat exchange relationship with said second heat exchanger when refrigerant flows through said first circuit in an opposite direction.

6. The system set forth in claim 1 including:

flow reversing means interposed between said third heat exchanger and said refrigerant circulation means and operable to reverse the direction of flow of refrigerant in said third circuit to provide heated refrigerant to said fourth heat exchanger for heating fluid in heat exchange relationship with said fourth heat exchanger when refrigerant flows through said third circuit in one direction and to provide cooled refrigerant to said fourth heat exchanger for cooling fluid in heat exchange relationship with said fourth heat exchanger when refrigerant flows through said third circuit in an opposite direction; and heating means for heating said medium so that refrigerant flowing through said third heat exchanger in said one direction is vaporized and flows to said fourth heat exchanger for condensation therein to provide for heating fluid in heat exchange relationship with said fourth heat exchanger.

7. The system set forth in claim 1 wherein said medium is selected from the group consisting of a glycol and water solution and a salt and water solution, whereby the freezing temperature of said medium is about 20° F.

8. An air conditioning system for reduced electric power consumption operation during peak power demand periods, comprising:

a compressor, a first heat exchanger and a second heat exchanger operably interconnected to define a first refrigerant circuit;

a thermal energy storage unit comprising a tank containing a thermal energy storage medium and a third heat exchanger interposed in said tank and connected to conduit means operable to be in fluid flow communication with said compressor and said first heat exchanger to define a second refrigerant circuit for cooling said thermal energy storage medium;

a fourth heat exchanger and refrigerant circulation means for circulating refrigerant between said third heat exchanger and said fourth heat exchanger to define a third refrigerant circuit; and flow control means interposed in said first refrigerant circuit and said second refrigerant circuit and adapted to effect refrigerant flow in said first refrigerant circuit for cooling fluid in heat exchange relationship with said second heat exchanger, in said second refrigerant circuit for cooling said thermal energy storage medium, and in said third refrigerant circuit for cooling fluid in heat exchange relationship with said fourth heat exchanger; and isolation means for isolating said first refrigerant circuit from said third refrigerant circuit.

9. The system set forth in claim 8 including flow reversing means interposed between said compressor and said first heat exchanger and operable to provide for reverse flow of refrigerant in said first refrigerant circuit to effect heating of fluid in heat exchange relationship with said second heat exchanger.

10. The system set forth in claim 8 including flow reversing means in communication with said refrigerant circulation means and said third heat exchanger for reversing the flow of refrigerant in said third refrigerant circuit, and heating means for heating said thermal energy storage medium, whereby in reverse flow of refrigerant through said third refrigerant circuit, fluid in heat exchange relationship with said fourth heat exchanger is heated.

11. The system set forth in claim 8 including a refrigerant storage vessel interposed in said second refrigerant circuit between said first heat exchanger and said third heat exchanger and first and second isolation valves interposed in said second refrigerant circuit between said storage vessel and said third heat exchanger and between said first heat exchanger and said storage vessel, respectively, for selective operation to allow refrigerant to be moved from said storage vessel to said third heat exchanger and to allow refrigerant to be moved from said third heat exchanger to said storage vessel.

12. The method of operating the air conditioning system as set forth in claim 8 to provide heating, comprising heating said thermal energy storage medium and circulating refrigerant fluid in said third refrigerant circuit between said third heat exchanger and said fourth heat exchanger.

13. The method of operating an air conditioning system as set forth in claim 12, including circulating refrigerant through said first refrigerant circuit between said compressor, said second heat exchanger and said first heat exchanger to condense refrigerant in said second heat exchanger and evaporate refrigerant in said first heat exchanger to provide heating with said second heat exchanger.

14. The method of operating an air conditioning system as set forth in claim 13 including circulating refrigerant in said first and third refrigerant circuits simultaneously to provide heating with said second and fourth heat exchangers.

15. A method of operating the air conditioning system of claim 8 to reduce the consumption of electric power during periods of peak power demand, comprising the steps of:

circulating refrigerant from said compressor through said first heat exchanger and said third heat exchanger during periods of non-peak power demand to cool said thermal energy storage medium; and circulating refrigerant through said third refrigerant circuit between said thermal energy storage unit and said fourth heat exchanger during periods of peak power demand to provide cooling with said fourth heat exchanger.

16. The method of operating an air conditioning system as set forth in claim 15, further including operating said compressor to circulate refrigerant through said first heat exchanger and said second heat exchanger while continuing to circulate refrigerant between said thermal energy storage unit and said fourth heat exchanger to provide cooling with said second and fourth heat exchangers simultaneously.

17. A method for operating an air conditioning system comprising a compressor, a first heat exchanger, a second heat exchanger for cooling fluid in heat exchange relationship with said second heat exchanger, said second heat exchanger being operably connected to said first heat exchanger and said compressor, a thermal energy storage unit comprising a tank having a thermal energy storage medium disposed therein and a third heat exchanger disposed in said medium, said third heat exchanger being operable to be in communication with said compressor and said first heat exchanger for circulating refrigerant to cool said medium, a fourth heat exchanger for cooling fluid in heat exchange relationship therewith and being operable to be in communication with said third heat exchanger for circulating refrigerant between said third heat exchanger and said fourth heat exchanger, and refrigerant circulation means for circulating refrigerant between said third heat exchanger and said fourth heat exchanger, said method comprising the steps of:

selectively operating said compressor to circulate refrigerant from said compressor through said first heat exchanger and said third heat exchanger during periods of relatively low electric power demand to cool said medium;

selectively operating said compressor to circulate refrigerant through said first heat exchanger and said second heat exchanger during periods of relatively low electric power demand to cool fluid in heat exchange relationship with said second heat exchanger; and selectively operating said refrigerant circulation means to circulate refrigerant between said third heat exchanger and said fourth heat exchanger during periods of relatively high electric power demand to cool fluid in heat exchange relationship with said fourth heat exchanger.

18. The method set forth in claim 17 including operating said compressor to circulate refrigerant through said first heat exchanger and said second heat exchanger and operating said refrigerant circulation means to circulate refrigerant between said third heat exchanger and said fourth heat exchanger to provide cooling with said second and fourth heat exchangers simultaneously.

19. The method set forth in claim 17 including increasing refrigerant charge in a circuit including said third heat exchanger before circulating refrigerant between said third heat exchanger and said fourth heat exchanger by condensing refrigerant in said third heat exchanger and allowing refrigerant to flow from a storage vessel in said system to said third heat exchanger.

20. The method set forth in claim 17 including the steps of:

providing heating with said fourth heat exchanger by heating said medium and circulating refrigerant between said third heat exchanger and said fourth heat exchanger to condense refrigerant in said fourth heat exchanger and evaporate refrigerant in said third heat exchanger; and circulating refrigerant through said compressor, said second heat exchanger and said first heat exchanger to condense refrigerant in said second heat exchanger and evaporate refrigerant in said first heat exchanger to provide heating with said second heat exchanger.

\* \* \* \* \*